United States Patent [19]

Tranter

[11] Patent Number: 4,889,350

[45] Date of Patent: Dec. 26, 1989

[54] BELLOWS SEAL ARRANGEMENT

[75] Inventor: Brian R. Tranter, High Wycombe, England

[73] Assignee: EG&G Limited, High Wycomb, England

[21] Appl. No.: 200,914

[22] Filed: Jun. 1, 1988

[30] Foreign Application Priority Data

Jun. 5, 1987 [GB] United Kingdom ............... 8713171

[51] Int. Cl.$^4$ .................. F16J 15/34; F16J 15/52
[52] U.S. Cl. ............................. 277/88; 277/42; 277/93 R; 277/27
[58] Field of Search ............... 277/27, 42, 43, 81 R, 277/88, 93 R, 93 SD

[56] References Cited

U.S. PATENT DOCUMENTS

| 1,363,378 | 12/1920 | Vuilleumier | 277/81 |
| 3,336,034 | 8/1967 | Smith | 277/88 |
| 3,713,707 | 1/1973 | Bennett | 277/90 |
| 4,202,553 | 5/1980 | Kropp | 277/93 SD |
| 4,240,610 | 12/1980 | Trimble | 277/200 |
| 4,415,165 | 11/1983 | Martini | 277/27 |
| 4,688,806 | 8/1987 | Heilala | 277/88 |
| 4,691,276 | 9/1987 | Miller et al. | 277/28 |

FOREIGN PATENT DOCUMENTS

| 1402270 | 7/1964 | France | 277/27 |
| 58-109774 | 6/1983 | Japan | 277/27 |
| 877190 | 11/1981 | U.S.S.R. | 277/27 |

Primary Examiner—William A. Cuchlinski, Jr.
Assistant Examiner—Diego F. F. Gutierrez
Attorney, Agent, or Firm—Finnegan, Henderson, Farabow, Garrett & Dunner

[57] ABSTRACT

A bellows seal arrangement (50) seals a rotating shaft (30) passing through a housing wall (32). The seal uses two bellows (56, 58) of different effective diameters (B, C) that are connected in series by a coupling member (60). The series-connected bellows (56, 58) are fixed to the housing at one end and carry a seal insert (54) at the other providing a seal interface with a seal face member (38) rotating with shaft (30). The coupling member has bridging portions (62, 64) extending parallel to the bellows and spaced from respective stop surfaces (66, 68). Both bellows are responsive to the external pressure (P2) and to the internal (shaft side) pressure (P$_1$). An excess of either pressure causes the larger effective diameter bellows (56) to expand or contract whereby one of the bridging portions (62, 64) abuts its stop surface (66, 68) to render one or other bellows inactive. By selection of the effective diameters (B, C) of the bellows (56, 58) relative to the internal and external diameter (A, D) of the seal interface the seal interface can be doubly-balanced to any desired degree with respect to both the internal (P1) and external (P2) pressures.

11 Claims, 1 Drawing Sheet

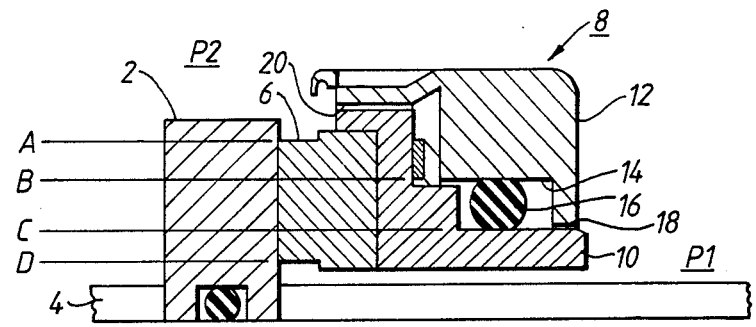
FIG. I.
PRIOR ART
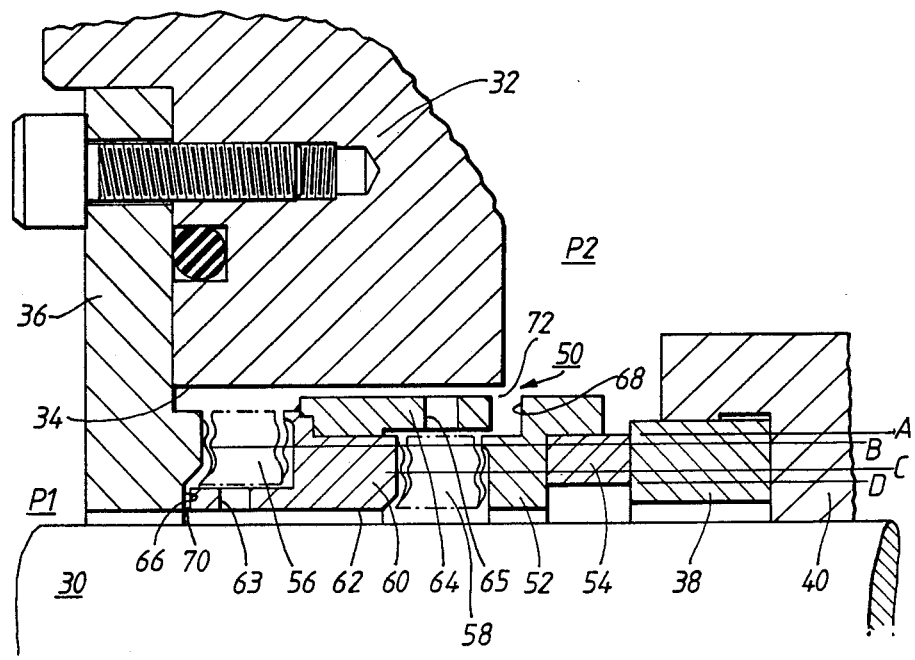
FIG. 2.

BELLOWS SEAL ARRANGEMENT

FIELD OF THE INVENTION

This invention relates to a bellows seal arrangement.

Bellows seals are conventionally employed in various forms of rotary seal for example where a rotating shaft passes through a stationary part such as the wall of a housing. A seal interface is formed between a seal member carried by bellows which is secured to one of the rotating shaft and the stationary part and a contacting seal face carried by a support member secured to the other of the rotating shaft and stationary part. Usually the seal member carried by the bellows is an annular seal insert secured to the bellows and engaging a seal face of greater radial extent carried by the other support member. Depending on the dimensions of the bellows and the radial dimensions of the seal interface, the sealing force at the interface can be substantially balanced with respect to the pressure internal or external to the bellows but not both. In fact one has to be traded off against the other. Balancing in this context is the degree to which the mechanical loading of the seal interface provided by the bellows can be made independent of an internal or external working pressure.

BACKGROUND TO THE INVENTION

Other forms of rotary seal are known which achieve a double balance, that is to say a balance with respect to both internal and external pressures, or more precisely to achieve such a balance to a predetermined degree or proportion. An example of such a rotary seal is illustrated in FIG. 1 of the accompanying drawings which shows a pusher seal.

In FIG. 1 a seal face member 2 is secured to rotate with a shaft 4. A stationary annular seal 6 insert engages the seal face 3 of member 2 to provide a seal interface between diameters A and D. The seal insert is carried by a stationary seal assembly 8 that is split into two parts 10 and 12. The inner part 10 directly carries the insert 6. The outer part 12 is secured to a support structure not shown so that to the right of the assembly, as seen in the figure, there exists an internal pressure P1 extending to the inner, shaft, side of the seal interface and to the left there exists an external pressure P2 acting on the outer side of the seal interface. The two parts 10 and 12 define between them an annular chamber 14 in which an O-ring 16 provides a seal between the two parts. The parts also define passageways 18 and 20 respectively by which the pressures P1 and P2 have access to, and are sealed from one another by, the O-ring 16. The O-ring acts between the seal interface diameters B and C.

As regards the internal pressure P1 the seal interface is balanced from diameter D to diameter B; for the external pressure P2 the seal interface is balanced from diameter A to diameter C. In the case, for example, of what is known as a 70/30 doubly balanced seal, the respective seal face areas between A and B on the one hand and C and D on the other will each be 30% of the total area.

SUMMARY OF THE INVENTION

In a bellows seal, such as outlined above, it has not been possible, to our knowledge, to provide a doubly balanced seal in which the balance ratios may be selected by the designer. There will be described below a bellows seal arrangement embodying the present invention that is doubly balanced. More particularly the bellows seal arrangement utilizes two bellows and a coupler device and the seal described can be dimensioned to provide a double balanced seal with any balance ratio for both internally and externally applied pressures.

In accord with one aspect of the present invention a bellows seal arrangement for a rotary seal comprises:

a member having a seal face, and a cooperating seal face insert defining a seal interface extending between outer and inner diameters, a bellows seal assembly supporting the seal face insert and comprising first and second bellows of different effective diameters serially connected by a coupling member, the coupling member comprising respective portions extending longitudinally of each bellows for bridging the respective bellows to render it inactive, and wherein the pressure responsive characteristics of the first and second bellows are such that an excess external or internal pressure will move one or other bridging portion respectively of the coupling member to bridge its associated bellows whereby the effective diameter of the other bellows determines the balance diameter at the seal interface.

Preferably the first or second bellows is bridged to be rendered inactive in response to an excess external or internal pressure respectively. The bellows having the greater effective diameter may be responsive to excess internal or external pressure. It responds to move the coupling member in one direction or the other to cause one or other of said first and second bellows to be bridged and rendered conductive. In a preferred arrangement an end of one of said first and second bellows distal said coupling member is secured to a support member having a surface engageable by said bridging portion associated with said one bellows and an end of the other bellows distal said coupling member serves to support said seal face member and carries a surface engageable by the bridging portion associated with the other bellows.

According to another aspect of this invention there is provided a double-balanced bellows rotary seal comprising an annular seal face member an annular seal face insert providing a seal interface with the seal face member, and comprising:

first and second bellows of larger and smaller effective diameter respectively disposed in series, the first and second bellows being arranged to be responsive to the same pressure external thereto and the same pressure internal thereto, means coupling said first and second bellows to act in series, stop means at said one and other end of the bellows assembly engageable by the coupling means upon movement thereof, said coupling means acting with one stop means to limit the compression of the first bellows in response to an applied external pressure, whereby the seal interface is balanced in respect of the external pressure over that portion of the seal interface area between the outer diameter thereof and said smaller effective diameter of the second bellows, and said coupling means acting with the other stop means to limit the extension of said first bellows in response to an applied internal pressure whereby the seal interface is balanced over the seal face area between the inner diameter thereof and said larger effective diameter.

A doubly balanced bellows seal arrangement will now be further described with reference to the accompanying drawings.

BRIEF DESCRIPTION OF THE DRAWINGS

FIG. 1, already referred to, shows a prior doubly balanced pusher seal; and

FIG. 2 shows a doubly balanced bellows seal embodying the invention.

DESCRIPTION OF PREFERRED EMBODIMENT

Referring now to FIG. 2 a shaft 30 passes through a housing 32 having an aperture 34 for receiving a bellows seal assembly 50 secured to an annular flange 36 bolted to the housing. On the shaft 30 a seal face member 38 is carried by a support member 40 secured to the shaft in any conventional manner. The bellows seal assembly 50 supports an annular member 52 which in turn carries an annular seal face insert 54 that engages the seal face member 38 to provide the required seal interface. The seal interface is subject to an internal pressure P1 within the bellows assembly and to an external pressure P2 exterior to the assembly.

The bellows assembly comprises two serially arranged bellows 56 and 58 connected by a coupler member 60. The bellows 56 is secured at its rearward end (to the left as seen in the figure) to the flange 36. The bellows 58 carries the seal insert support member 52. The coupler member 60 is annular and is connected between the forward end of bellows 56 and rearward end of the bellows 58. The coupler 60 is provided with rearwardly and forwardly projecting portions 62 and 64 respectively that are respectively engageable with stop surfaces 66 and 68. Surface 66 is on the flange 36; surface 68 is a radial flange surface forming part of support member 52. Specifically portions 62 and 64 may be cylindrical and are provided with apertures 63 and 55 respectively that ensure access to the bellows of pressures P1 and P2 respectively. It will be seen that pressure P1 acts on the interior of both bellows 56 and 58, and that pressure P2 acts on the exterior of both bellows. The two extensions 62 and 64 extend longitudinally of bellows 56 and 58 respectively and upon engagement of one or other with surface 66 or 68 respectively, the portion concerned bridges its associated bellows to render it inactive as far as concerns the application of mechanical loading to the seal interface by that bellows.

Before describing the operation of the bellows assembly, certain dimensional parameters will be noted using the same notation as was used in describing FIG. 1. The seal interface extends from an outer diameter A to an inner diameter D. Bellows 56 has an effective diameter B. Bellows 58 has an effective diameter C that is less than B, and diameters B and C both lie between diameters A and D in the embodiment illustrated but one, or both, could be outside this diameter range. The effective diameter of a bellows is that diameter at which the fluid pressure acting on the bellows can be taken to act. The gap 70 between the rearward edge of projection 62 and flange surface 66 is minimal, i.e. the two are normally just contacting. The gap 72 between the forward edge of projection 64 and the surface 68 is small but distinct requiring a small extension of bellows 56 to engage the two. In any event gap 70 is less than gap 72.

Operation of the two-bellows seal is as follows. When external pressure P2 is applied it acts at the diameter B of bellows 56 and the diameter C of bellows 58 thereby tending to compress bellows 56 and to press the rear edge of projection 62 against flange surface 66 so that bellows 56 is bridged by the projection and is prevented from collapsing further under the influence of pressure and hence unloading the seal face. External pressure P2 acts down to the effective diameter C of bellows 58 and the seal is balanced to this diameter in respect of external pressure as was the case in the seal of FIG. 1. If there is an internal pressure P1 acting, the bellows 56 extends in the same way as described above to close the gap 72 whereupon bellows 58 is prevented from collapsing and hence the faces tend to open having been bridged by the projection 64. The bellows 56 provides a balance diameter B at the seal interface for internal pressure, once again as was the case in the seal of FIG. 1.

It can be seen that by selecting the effective diameters B and C of the bellows 56 and 58, a 70/30 double balanced seal can be realised, or any other combination of balance ratios that might be wanted.

I claim:

1. A bellows seal arrangement for a rotary seal comprising:
   a member having a seal face;
   a bellows assembly supporting a seal face insert in engagement with said seal face of said member to define an annular seal interface, said seal interface having an inner seal interface diameter and an outer seal interface diameter;
   said bellows seal assembly including first and second bellows serially connected by a coupling member and arranged to be responsive to the same pressure external thereto and the same pressure internal thereto, said first bellows having a greater effective diameter than that of said second bellows;
   said coupling member being movable as said bellows expand and contract and including first and second portions which during movement can bridge, respectively, the first and second bellows and render the bridged bellows inactive;
   a first stop means engageable by the first portion of said coupling member to provide a bridge across said first bellows limiting compression of said first bellows, whereby said second bellows remains active to maintain the engagement of said seal face insert with the seal face of said member; and
   a second stop means engageable by the second portion of said coupling member to provide a bridge across said second bellows limiting compression of said second bellows, whereby said first bellows remains active to maintain the engagement of said seal face insert with the seal face of said member.

2. A bellows seal arrangement as claimed in claim 1 wherein a second gap exists between said second stop means and the second portion of said coupling member portion which is closable in response to an excess internal pressure and a first gap exists between said first stop means and the first portion of said coupling member which is closable in response to an excess external pressure and wherein the second gap is substantially greater than said first gap.

3. A bellows seal arrangement as claimed in claim 1 wherein said second bellows supports an annular member which in turn carries said seal face insert.

4. A bellows seal arrangement as claimed in claim 1 wherein said coupling member is annular and is connected between the forward end of said first bellows and the rearward end of said second bellows.

5. A bellows seal arrangement a claimed in claim 4 wherein said first portion of said coupling member extends longitudinally beneath said first bellows and includes an aperture for providing access to the pressure beneath said first bellows and said second portion of said coupling member extends longitudinally over said second bellows and includes an aperture for providing access to the pressure over said second bellows.

6. A bellows seal arrangement as claimed in claim 5 wherein said first and second portions of said coupling member are cylindrical.

7. A double-balanced bellows rotary seal comprising:
an annular seal face member;
an annular seal face insert providing a seal interface with the seal face member said seal interface having an inner seal interface diameter and an outer seal interface diameter,
a bellows assembly supporting said seal face insert, said bellows assembly including: first and second bellows of larger and smaller effective diameters, respectively, disposed in series, the first and second bellows being arranged to be responsive to the same pressure external thereto and the same pressure internal thereto and means coupling said first and second bellows to act in series, said coupling means being moveable as said bellows expand or contract;
end stop means positioned at opposite longitudinal ends of the bellows assembly and engageable by the coupling means upon movement thereof,
said coupling means acting with one end stop means to limit the compression of the first bellows in response to an applied external pressure, whereby the seal interface is balanced in respect of the external pressure over that portion of the seal interface area between said outer seal interface diameter and said smaller effective diameter of the second bellows, and
said coupling means acting with the other end stop means to limit the extension of said first bellows in response to an applied internal pressure whereby the seal interface is balanced over the seal face area between said inner seal interface diameter and said larger effective diameter.

8. A double-balanced rotary seal as claimed in claim 7 in which the amount of movement of said coupling means required to engage one of said end stop means is substantially greater than the amount of movement of said coupling means required to engage the other of said end stop means.

9. A bellows seal arrangement for a rotary seal comprising:
a member having a seal face, and a cooperating seal face insert defining a seal interface, said seal interface having an inner seal interface diameter and an outer seal interface diameter,
a bellows seal assembly supporting the seal face insert, said bellows assembly including first and second bellows of different effective diameters serially connected by a coupling member which is moveable as said bellows expand and contract;
the coupling member including respective bridging portions extending longitudinally of each bellows for bridging the respective bellows and rendering the bridged bellows inactive, an end of one of said first and second bellows distal said coupling member being secured to a support member having a surface engageable by the bridging portion associated with said one bellows and an end of the other bellows distal said coupling member serving to support said seal face insert and carrying a surface engageable by the bridging portion association with the other bellows, and wherein
the pressure responsive characteristics of the first and second bellows are such that the bellows of greater effective diameter is responsive to an excess external or internal pressure to move said coupling member in one or other direction and cause the bridging portion of the coupling member associated with said first or second bellows respective to bridge its associated bellows and render it inactive, whereby the effective diameter of the second or first bellows respectively determines the balance diameter at the seal interface.

10. A bellows seal arrangement as claimed in claim 9 in which said first or second bellows is bridged to be rendered inactive in response to an excess external or internal pressure respectively.

11. A bellows seal as claimed in claim 9 in which the effective diameters of said first and second bellows are greater than said inner seal interface diameter and are less than said outer seal interface diameter.

* * * * *